US012132257B1

(12) United States Patent
Hussain

(10) Patent No.: US 12,132,257 B1
(45) **Date of Patent: *Oct. 29, 2024**

(54) RECONFIGURABLE PLANAR MIMO ANTENNA SYSTEM

(71) Applicant: KING FAHD UNIVERSITY OF PETROLEUM AND MINERALS, Dhahran (SA)

(72) Inventor: Rifaqat Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,179

(22) Filed: Jul. 9, 2024

Related U.S. Application Data

(63) Continuation of application No. 17/675,239, filed on Feb. 18, 2022, now Pat. No. 12,068,540.

(51) Int. Cl.
*H01Q 21/00* (2006.01)
*H01Q 5/321* (2015.01)
(Continued)

(52) U.S. Cl.
CPC ......... *H01Q 21/0075* (2013.01); *H01Q 5/321* (2015.01); *H01Q 7/005* (2013.01);
(Continued)

(58) Field of Classification Search
CPC .. H01Q 21/0075; H01Q 7/005; H01Q 9/0464; H01Q 21/064; H01Q 1/52;
(Continued)

(56) References Cited

U.S. PATENT DOCUMENTS

2008/0303733 A1 12/2008 Chiu et al.
2017/0033461 A1 2/2017 Mohajer Jasebi et al.
(Continued)

FOREIGN PATENT DOCUMENTS

JP 2004-320115 A 11/2004

OTHER PUBLICATIONS

S. P. Rodriguez-Albarran, et al., "Multiband tunable MIMO antenna", The Loughborough Antennas & Propagation Conference (LAPC 2018), Nov. 12-13, 2018, 2 pages (Abstract only).

*Primary Examiner* — Hoang V Nguyen
*Assistant Examiner* — Yonchan J Kim
(74) *Attorney, Agent, or Firm* — Oblon, McClelland, Maier & Neustadt, L.L.P.

(57) ABSTRACT

A reconfigurable, dual-band, MIMO antenna apparatus, a planar MIMO antenna system utilizing the antenna apparatus, and a method of transmitting and receiving a signal by the antenna apparatus are provided. The apparatus includes a dielectric planar substrate, a first element, a second element, two varactor diodes per element, and a microstrip feed-line. The first element and the second element each have slotted concentric annular rings. The second element is separated on the dielectric planar substrate from the first element, but is coplanar on the dielectric planar substrate with the first element. The two varactor diodes are placed in series with biasing circuitry, the biasing circuitry including RF chokes and current-limiting resistors. The microstrip feed-line feeds both antenna elements. The dual-band antenna elements can each be independently and concurrently tunable to two signal frequencies bands.

12 Claims, 13 Drawing Sheets

(51) Int. Cl.

| | |
|---|---|
| ***H01Q 7/00*** | (2006.01) |
| ***H01Q 9/04*** | (2006.01) |
| ***H01Q 13/10*** | (2006.01) |
| ***H01Q 21/06*** | (2006.01) |
| ***H01Q 21/28*** | (2006.01) |

(52) U.S. Cl.
CPC ........... *H01Q 9/0464* (2013.01); *H01Q 13/10* (2013.01); *H01Q 21/064* (2013.01); *H01Q 21/28* (2013.01)

(58) Field of Classification Search
CPC ........ H01Q 5/321; H01Q 13/10; H01Q 21/08; H01Q 21/28
See application file for complete search history.

(56) References Cited

U.S. PATENT DOCUMENTS

| | | | |
|---|---|---|---|
| 2018/0219292 | A1 | 8/2018 | Kenkel |
| 2019/0305423 | A1 | 10/2019 | Hussain |
| 2019/0379135 | A1 | 12/2019 | Sharawi |
| 2021/0013629 | A1 | 1/2021 | Sharawi |

RECONFIGURABLE PLANAR MIMO ANTENNA SYSTEM

CROSS-REFERENCE TO RELATED APPLICATIONS

The present application is a Continuation of U.S. application Ser. No. 17/675,239, now allowed, having a filing date of Feb. 18, 2022.

STATEMENT REGARDING PRIOR DISCLOSURE BY THE INVENTORS

Aspects of the present disclosure were described in "Independent and Concurrent Tunable 5G MIMO Antenna Design," Rifaqat Hussain, IET *Microwaves, Antennas & Propagation Journal* (Feb. 24, 2021).

BACKGROUND

Technical Field

The present disclosure is directed to a fifth generation (5G) antenna design and, more specifically, is directed to a slot frequency reconfigurable (FR) 5G dual-band, multi-input, multiple-output (MIMO) antenna using concentric, annular elements.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fifth generation (5G) wireless technology has been developed to provide high data rates, low latencies, improved reliability, and enhanced energy and spectral efficiencies when compared to previous standards. However, use of the existing standards simultaneously with early stages of 5G commercialization for both sub-6 GHz along with mm-wave bands are envisioned to enable a smooth transition. As a result, the sub-6 GHz bands will be used to support and enhance mobile broadband in conjunction with existing 4G resources that can be reused for 5G communication.

The 5G radio access networks (RANs) are specified to support multiple-input-multiple-output (MIMO) antenna systems. Based on that aspect, 5G RANs will use multi-band antenna designs with independent or concurrent tuning capabilities for frequency agility. Several common challenges arise for sub-6 GHz antenna designs, including large bandwidth requirements, multi-band antenna designs, and MIMO implementation with maximum antenna elements within the given space. Accordingly, concurrent and independent tuning for frequency reconfigurable (FR) antennas, in addition to multi-band operation with multiple connection and very wide sweep, are features being implemented for 5G sub-6 GHz communication systems.

Various types of antennas have been proposed for enabling these technologies, such as dipole, monopole, patch (e.g., U.S. Patent Application 2017/0033461A1), cube (e.g., U.S. Patent Application 2008/0303733A1), and slot-based approaches. However, slot-based antenna designs have provided the greatest number of advancements. Slot-based antennas are typically compact planar designs, can be flexibly integrated with other system components, are potentially suitable for FR operation, and possess wide-band tuning capabilities.

Numerous slot-based solutions previously developed enabled two or more bands, tuning, and/or planar concepts. For example, U.S. Patent Application 2018/0219292A1 discloses a multi-band slotted solution. Slot-based designs with 4-antenna elements or with three covered frequency bands have been proposed. Some developments, such as JP 2004320115A, have relied on composite annular layouts. However, many have either limited tuning capabilities or relatively large board dimensions.

Each of the aforementioned antennas suffers from one or more drawbacks hindering their adoption. Accordingly, it is one object of the present disclosure to provide a small antenna suitable for FR operation, that can be flexibly integrated with other system components, while still possessing wide-band tuning capabilities.

SUMMARY

In an exemplary embodiment, a reconfigurable dual-band MIMO antenna apparatus includes a dielectric planar substrate, a first element, a second element, two varactor diodes per element, and a microstrip feed-line. The first element and the second element each have slotted concentric annular rings. The second element is separated on the dielectric planar substrate from the first element, but is coplanar on the dielectric planar substrate with the first element. The two varactor diodes are placed in series with biasing circuitry, the biasing circuitry including RF chokes and current-limiting resistors. The microstrip feed-line feeds both antenna elements. The dual-band antenna elements can each be independently and concurrently tunable to two signal frequencies bands.

In some embodiments, both concentric slots are approximately 0.5 mm in width and are excited by the same microstrip feed-line placed on the dielectric planar substrate at the opposite side of the slot. In certain embodiments, a voltage is applied to a terminal of one or more of the varactor diodes to change a capacitance of the varactor diodes, thereby tuning an independent external signal frequency of either of the first element or the second element of the antenna apparatus. In certain embodiments, the varactor diodes change in capacitance due to a reverse bias voltage. In embodiments, each antenna element can be configured to transmit or receive a signal frequency between two different ranges as the capacitance of the varactor diodes change.

In certain embodiments, the varactor diode locations on the antenna elements are selected to provide an impedance match of the antenna apparatus to an electrical load of the microstrip feed-line. In some embodiments, the antenna apparatus has a compact planar structure suitable for use in a mobile device wherein each antenna element is less than $12\times12$ $mm^2$. In particular embodiments, radiation patterns of the antenna elements are configured to support an envelope correlation coefficient of less than 0.5. In some embodiments, the inner and outer concentric slots are placed on an outer edge of a ground plane with radii of 8-10 mm and 10-12 mm, respectively.

In certain embodiments, the antenna apparatus is configured to support a radiation pattern with efficiency of 90 percent at 3.6 GHz. In particular embodiments, the antenna is configured to support a radiation pattern of an antenna elements with a peak gain of 4.3 decibels-isotropic (dBi)

achieved at 3.6 GHz. In other embodiments, the antenna is configured to support a peak gain of 2.98 dBi, which is achieved at 2.52 GHz.

In another exemplary embodiment, a method of transmitting and receiving a signal at varying frequencies from either of two dual-band planar annular concentric slot MIMO antenna elements is provided. An input impedance is varied by selecting a first location on a first antenna element of a first varactor diode. A second location on a second antenna element of a second varactor diode is selected. A signal frequency is tuned by varying either a capacitance of the first varactor diode or a voltage on a second varactor diode.

In some embodiments, the concentric slots are placed on an outer edge of a ground plane. In certain embodiments, tuning the frequency of each antenna element includes applying a voltage between 0 and 10 V to obtain a frequency range between either 1.7 GHz and 2.4 GHz or between 2.4 and 3.8 GHz. In certain embodiments, the antenna is configured to support a radiation pattern with efficiency of 90 percent. In particular embodiments, the antenna is configured to have an efficiency of 90 percent at 3.6 GHz.

In some embodiments, the varactor location is determined by solving the following equation: $\tan \beta L_1 + \tan \beta(L-L_1) - \omega C Z_0 \tan \beta L_1 \tan \beta(L-L_1) = 0$, where, $L_1$ is a varactor location, $C_v$ is a reverse-biased varactor capacitance, $Z_0$ is an impedance of a slot antenna element, ω is the angular frequency of operation, and β is the propagation constant, which depends on ω and $C_v$.

In another exemplary embodiment, a planar MIMO antenna system that is frequency reconfigurable between 1.7 and 3.8 GHz includes the reconfigurable dual-band MIMO antenna apparatus, respective RF chokes for the first and second elements, and respective current limiting resistors for the first and second elements.

In some embodiments, the varactor diodes of the antenna system are configured to change in capacitance from 0.46 pF to 2.4 pF due to a voltage between 10 V and 0 V being applied to either of the varactor diodes, which results in an antenna signal frequency range between 1.7 GHz and 3.8 GHz.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
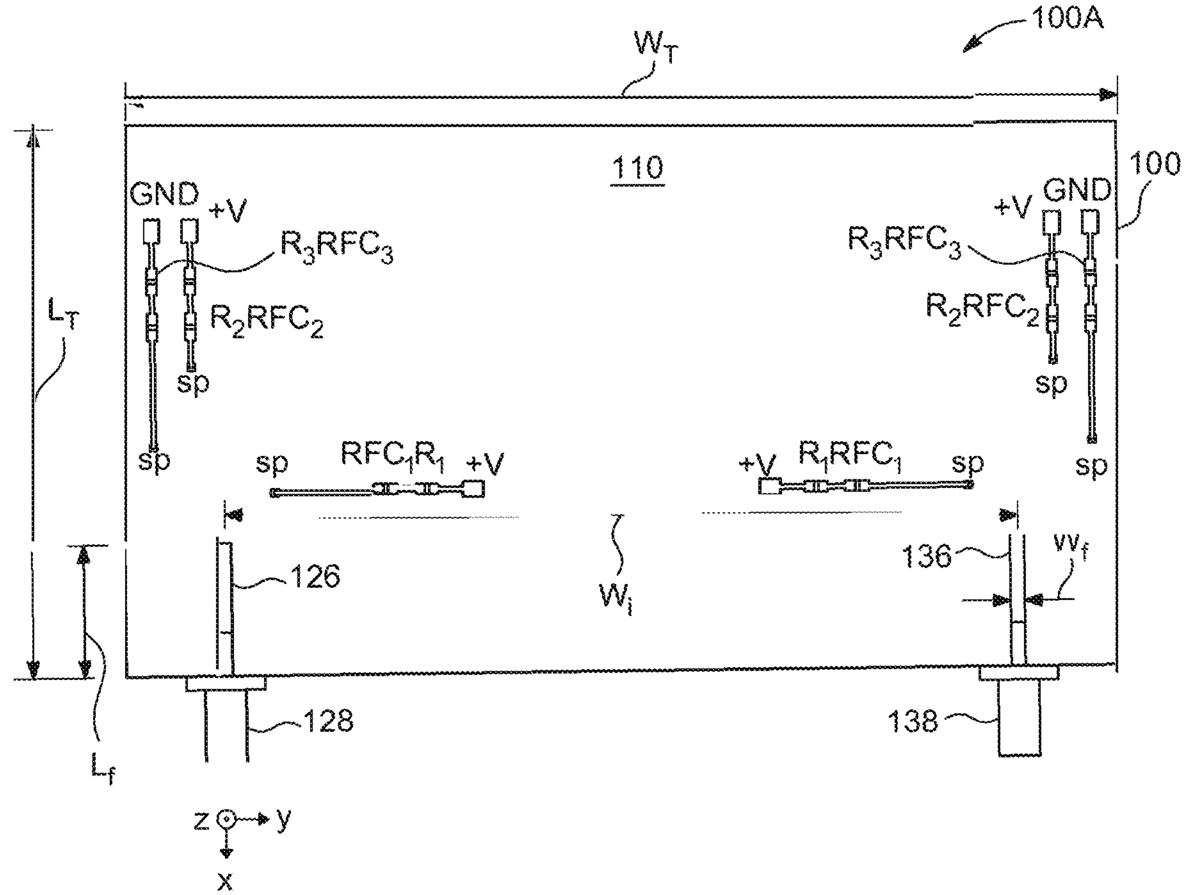
FIG. 1A is a top view of a schematic diagram of a frequency reconfigurable (FR), dual-band, multiple-input, multiple-output (MIMO) antenna apparatus, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to an antenna apparatus having a compact overall footprint, while at the same time enabling dual-band operation with independent and concurrent tuning capabilities. The described embodiments are suitable for existing fourth generation (4G) standards, as well as for the transition that has begun to fifth generation (5G) radio access networks (RANs). Antenna diversity features, such as those described above and below, help enable the simultaneous integration of mobile devices that use those antennas into 4G and 5G networks. In addition, the proposed 5G radio access technology enabled by the antenna apparatus of the present disclosure is suitable for multiple, concurrent connections using cognitive radio (CR) techniques.

A dual-band, concentric annular slots antenna design is presented in the instant disclosure with flexibility to control both bands. Features include independent and concurrent tuning capability across the dual-band operation, using a simple biasing network. Thus, dual-band operation can be guaranteed over a frequency range from 1.7-3.8 GHz with a compact size, using coverage bands from 1.7-2.4 GHz and 2.4-3.8 GHz. Moreover, independent tuning capabilities with narrow-band (NB) operation enables better power management in 5G communication, along with stable antenna operation. The described antenna design can be fabricated on a board having a volume of 60×120×0.76 $mm^3$, with a single element footprint of just 11×11 $mm^2$.

In order to cover the widest frequency bands of 4G and 5G wireless technologies possible, the width of each annular antenna structure, or slot, and the distances between each slot are optimized for tuning the overall antenna. Another aspect of the described apparatus is the use of two varactor diodes per pair of slots (also referred to as antenna elements) to lower the frequencies of resonating bands, as well as to obtain a continuous sweep of frequencies. The location and placement of the varactor diodes are precisely determined to define the exact resonating bands, to improve input impedance ($Z_{in}$) matching, and to allow a frequency sweep across wideband spectrum. Parametric analyses were performed to optimize the placement of the varactor diodes on the slot structure, in turn obtaining enhanced $Z_{in}$ matching. The dimensions and diode placements of the described embodiments result in a continuous frequency sweep from 1.7-3.8 GHz, thereby covering several newly used wireless bands found in 5G sub-6 GHz RANs.

Figure 1B:
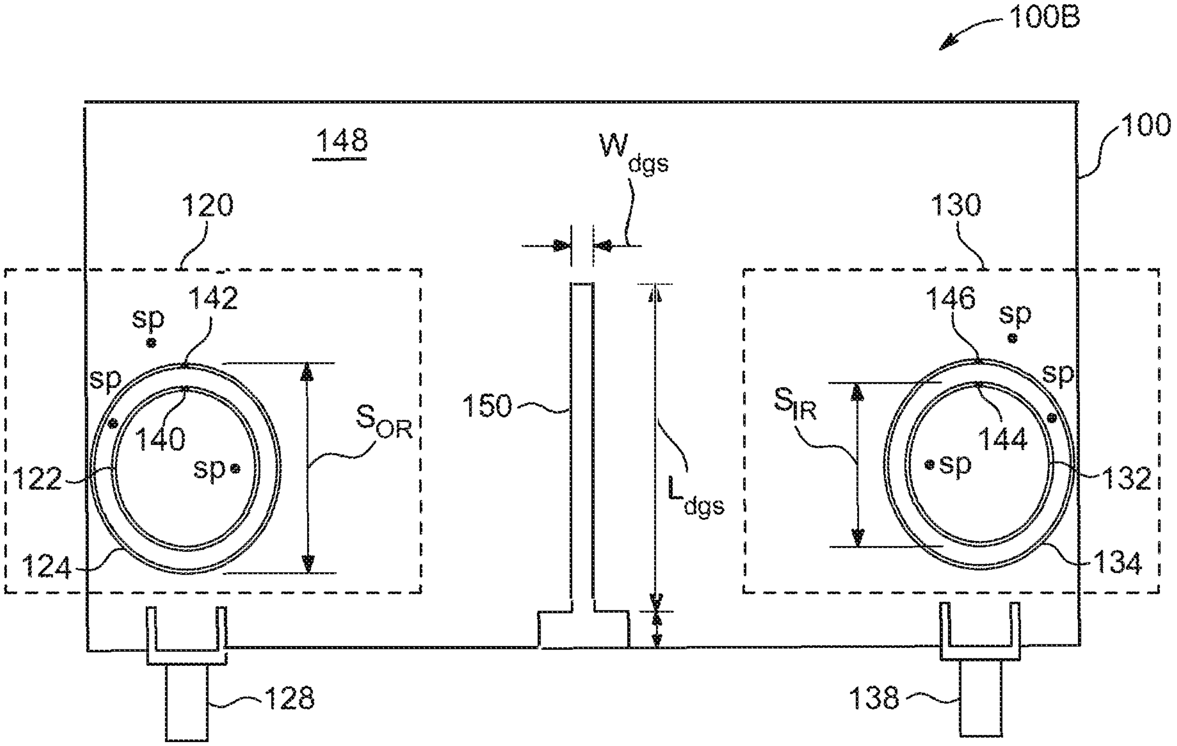
FIG. 1B is a bottom view of a schematic diagram of an FR, dual-band, MIMO antenna apparatus, according to certain embodiments.

FIG. 1A is a top view 100A of a schematic diagram of a frequency reconfigurable (FR) dual-band, multiple-input, multiple-output (MIMO) antenna apparatus 100 (or simply "antenna apparatus 100"). FIG. 1B is a bottom view 100B of a schematic diagram of the FR dual-band MIMO antenna apparatus 100. The antenna apparatus 100 includes a dielectric planar substrate 110, having dimensions of a total length (denoted as "$L_T$" in FIG. 1A) by a total width (denoted as "$W_T$" in FIG. 1A). In some embodiments, $W_T$ can be 120 mm, while $L_T$ can be 60 mm.

The antenna apparatus 100 includes two concentric, annular, slot-based elements, shown in FIG. 1B as a first antenna element 120 (or "first element 120") and a second antenna element 130 (or "second element 130"). First element 120 and second element 130 are formed on a ground (GND) plane 148, which in turn is formed on the bottom side of dielectric planar substrate 110. The first element 120 and the second element 130 each have slotted concentric annular rings. The first element 120 has two slotted concentric annular rings, shown as a first inner ring 122 and a first outer ring 124. The first element 120 also includes a first microstrip feed line 126 and a first connection port 128. The second element 130 has two slotted concentric rings, illustrated as a second inner ring 132 and a second outer ring 134, along with a second microstrip feed line 136 and a second connection port 138.

The distance between the first microstrip feed line 126 and the second microstrip feed line 136 is referenced as "$W_i$" in FIG. 1A. In certain embodiments, $W_i$ can be 96.02 mm. The length of the first microstrip feed line 126 and the second microstrip feed line 136 is denoted as "Lf," which can be 14.5 mm in some embodiments. The width of each microstrip feed line is measured as "$W_f$" in FIG. 1A. In certain embodiments, We can be 1.72 mm.

The first outer ring 124 and the second outer ring 134 have a size or diameter, denoted as "$S_{OR}$" in FIG. 1B. The first inner ring 122 and the second inner ring 132 have a size or diameter, denoted as "$S_{IR}$" in FIG. 1B. The value of $S_{OR}$ can be 22.98 mm and $S_{IR}$ can be 17.5 mm in one embodiment.

In some embodiments, the first inner ring 122, the first outer ring 124, the second inner ring 132 and the second outer ring 134 are approximately 0.5 mm in width. Both the first element 120 and the second element 130 can be placed on the outer edges of the GND plane 140. The second element 130 is separated on the GND plane 148 and the dielectric planar substrate 110 from the first element 120, but is coplanar with the first element 120.

The antenna apparatus 100 also includes varactor diodes 140, 142, 144, and 146, as shown in FIG. 1B. The varactor diodes 140, 142, 144, and 146 are placed in series with biasing circuitry, which is depicted in FIG. 1A. The biasing circuitry connected to the varactor diodes 140 and 144 includes RF chokes, denoted as $RFC_1$, and current-limiting resistors, denoted as $R_1$. Similarly, the biasing circuitry connected to the varactor diodes 142 and 146 includes RF chokes, denoted as $RFC_2$, and current-limiting resistors, denoted as $R_2$ as well as RF chokes denoted as $RFC_3$ and current-limiting resistors, denoted as $R_3$ as depicted in FIG. 1A.

As depicted in FIGS. 1A and 1B, the first element 120 and the second element 130 are both excited by the first microstrip feed line 126 and the second microstrip feed line 136, respectively, placed on the dielectric planar substrate at the opposite side of the slot. The locations of the varactor diodes 140-146 can be selected to provide an impedance match of the respective antenna element to an electrical load of the microstrip feed lines 126 and 136.

The antenna apparatus 100 further includes a defected ground structure (DGS) 150 on the GND plane 148 as shown in FIG. 1B. The length of the DGS 150 is denoted as "$L_{dgs}$," which can be 36 mm in some embodiments. The width of the DGS 150 is measured as "$W_{dgs}$" in FIG. 1B. In certain embodiments, $W_{dgs}$ can be 3 mm Shorting posts, denoted as "sp" in the FIGS. 1A and 1B, can be utilized to connect circuit elements on the top layer of antenna apparatus 100 seen in FIG. 1A with those on the bottom layer seen in FIG. 1B.

As shown in FIGS. 1A and 1B, the dual-band antenna elements 120 and 130 can each be independently and concurrently tunable to two signal frequencies bands. For example, a voltage can be applied to a terminal of one or more of the varactor diodes 140-146 to change a capacitance of the varactor diodes, thereby tuning an independent external signal frequency of either of the first element 120 or the second element 130 of the antenna apparatus 100. In certain embodiments, the varactor diodes 140-146 change in capacitance due to a reverse bias voltage. As shown in FIGS. 1A and 1B, each antenna element can be configured to transmit or receive a signal frequency between two different ranges as the capacitance values of the varactor diodes 140-146 change.

As illustrated, the antenna apparatus 100 has a compact planar structure suitable for use in a mobile device, such as a smart phone, a tablet, or a laptop. For example, each of the antenna elements 120 and 130 can be less than $12 \times 12$ mm$^2$, as the value of $S_{OR}$ can be less than 11.5 mm. In certain embodiments, the first and second elements 120 and 130 are placed on an outer edge of the ground plane 148, with inner rings 122 and 132 having radii of 8-10 mm and outer rings 124 and 134 having radii of 10-12 mm.

Figure 1C:
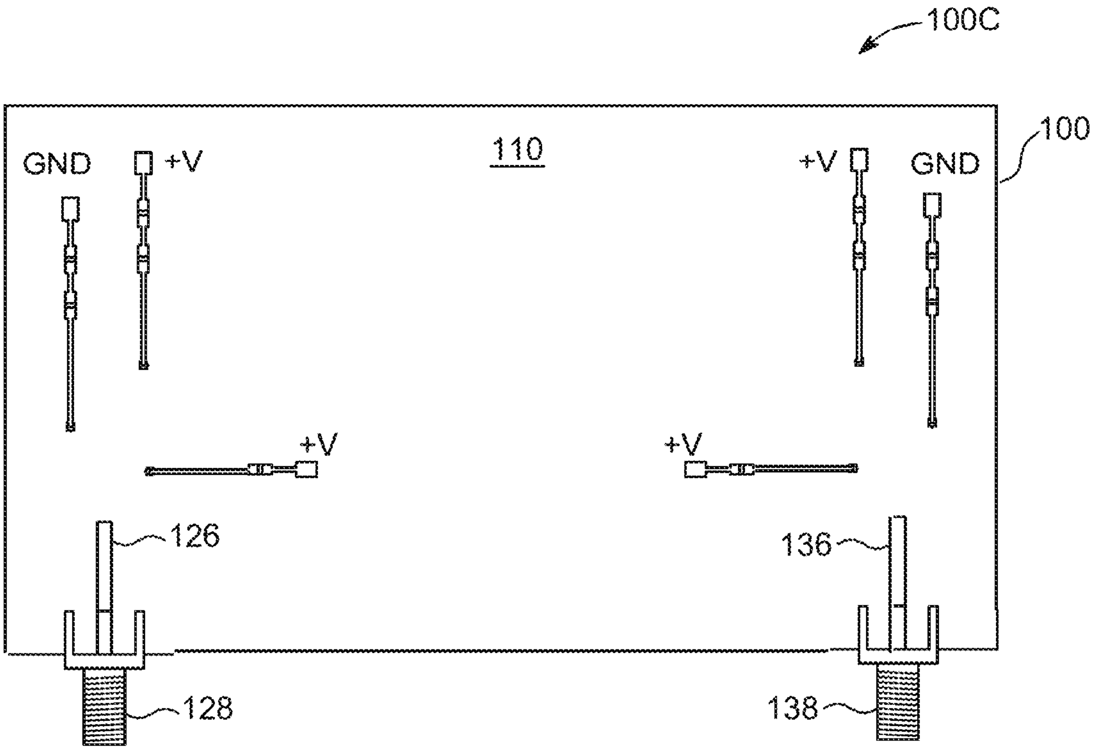
FIG. 1C is a top view of a fabricated FR, dual-band, MIMO antenna apparatus, according to certain embodiments.
Figure 1D:
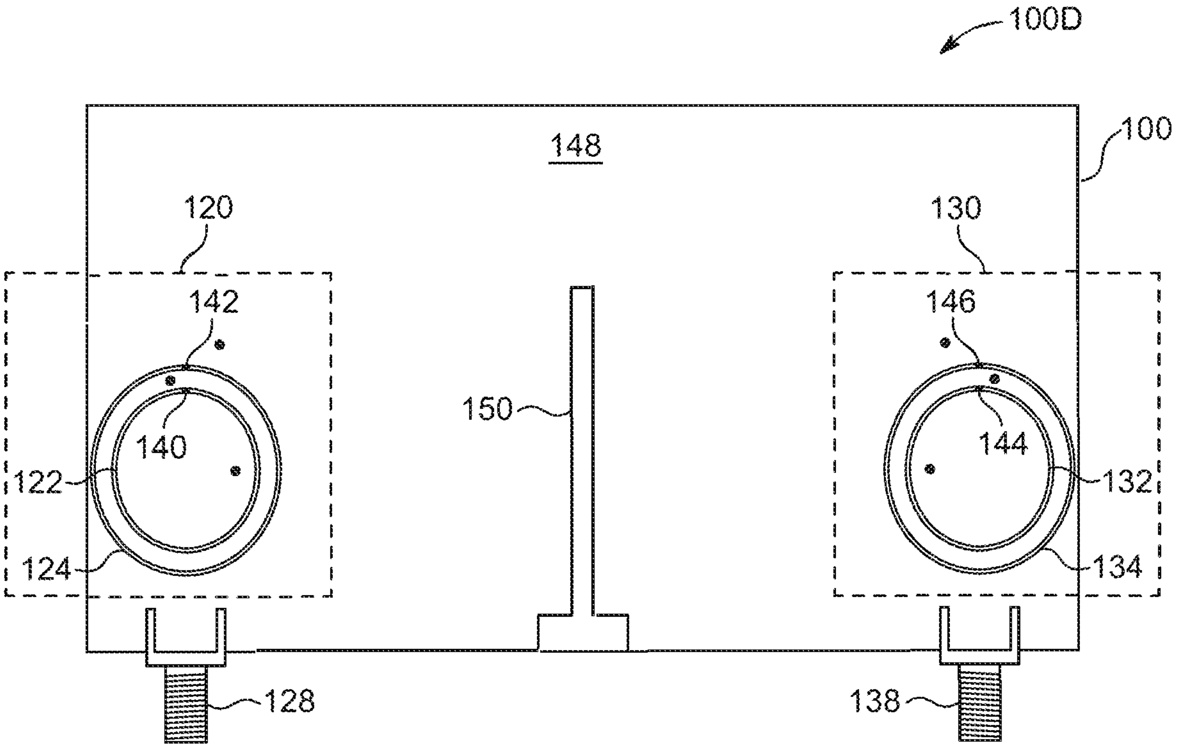
FIG. 1D is a bottom view of a fabricated FR, dual-band, MIMO antenna apparatus, according to certain embodiments.

Turning to FIG. 1C, a top view 100C is shown of a fabricated example of the FR, dual-band, MIMO antenna apparatus 100. FIG. 1D is a bottom view 100D of the fabricated FR, dual-band, MIMO antenna apparatus 100. The fabricated antenna apparatus 100 can be developed on substrate board suitable for high frequency applications, such as a RO4350B laminate (available from Rogers Corp. of Chandler, Ariz.). The RO4350B laminate has a dielectric constant ($\varepsilon_r$) of 3.48 and thickness of 0.76 mm. The fabricated antenna apparatus 100 can be produced using a circuit board plotter, such as an LPKF Protomat S103 circuit board plotter available from LPKF Laser and Electronics AG (of Garbsen, Germany).

The inner rings 122 and 132 and the outer rings 124 and 134 as shown in FIG. 1D can be produced with radii of 8.75 mm and 11.49 mm, respectively. The width of each slot can be 0.5 mm. The dimensions and placement of each feature of the elements 120 and 130 (e.g., the inner rings 122 and 132, the outer rings 124 and 134, and the varactor diodes 140-146) can be optimized to obtain better MIMO performance and improve input impedance matching $Z_{in}$ over frequency bands of the greatest interest (e.g., sub-6 GHz 4G and 5G frequency bands). Both of the elements 120 and 130 can be excited using the microstrip lines 126 and 136 that were placed on the opposite side of the antenna structure.

The top layer 100C of the fabricated board shown in FIG. 1C has the associated biasing circuitry for loading the element features and the microstrip feed-lines 126 and 136. In the illustrated biasing circuitry, the varactor diodes 140-146 were placed in series with the RF chokes $RFC_1$ and $RFC_2$ and the current-limiting resistors $R_1$ and $R_2$. The elements are connected via the shorting posts as labeled above in FIGS. 1A and 1B.

Both of the elements 120 and 130 can be reactively loaded using varactor diodes (such as varactor diodes 140-146). In doing so, the capacitance values increase resulting in lowering the fundamental resonance frequency, in addition to reducing with higher-order resonance frequencies to lower bands. As an example, SMV 1231 Series hyperabrupt junction tuning varactors (available from Skyworks Solutions, Inc. of Irvine, Calif.) can be used as the varactor diodes 140-146.

The antenna elements 120 and 130 with short-circuited structures at both ends can be modeled as a half transmission line, corresponding to their respective fundamental resonance frequencies. The fundamental resonance frequency of the antenna element can be represented by the following:

$$f_r = \frac{c}{0.5\pi(r_2 + r_1)} \times \sqrt{\frac{\varepsilon_r + 1}{2\varepsilon_r}} \qquad \text{(Eq. 1)}$$

where c is the speed of light, ¿, is the relative permittivity of the substrate 110, and $f_r$ is the fundamental resonance frequency of the antenna element. The radii of the inner rings 122 and 132 and the outer rings 124 and 134 are represented by $r_1$ and $r_2$, respectively. The term 0.5T $(r_2+r_1)$ represents the mean circumference of combined annular structure (i.e., element 120 or element 130).

Both of the elements 120 and 130 can be reactively loaded using varactor diodes (such as varactor diodes 140-146) to increase capacitance values. In doing so, the capacitance increase results in lowering the fundamental resonance frequency, in addition to reducing with higher-order resonance frequencies to lower bands. The reactive loading is a non-uniform operation that can be determined by using the location ($L_1$) of the varactor diodes 140-146, the capacitance value C of the varactor diodes 140-146, and impedance ($Z_0$) of the slot-line structure 150. The transmission line equivalent circuit model of the antenna apparatus (discussed in further detail below) can be utilized to calculate the resonance frequency. The resonance frequency of the reactively loaded antenna element can be determined numerically solving the below equation:

$$\tan \beta L_1 + \tan \beta(L - L_1) - \omega C Z_0 \tan \beta L_1 \tan \beta(L - L_1) = 0 \qquad \text{(Eq. 2)}$$

In the above equation, $\beta$ is the propagation constant and depends on the frequency of operation. The reverse biased varactor capacitance is represented by C, and $\omega$ is the angular frequency of operation.

Figure 2A:
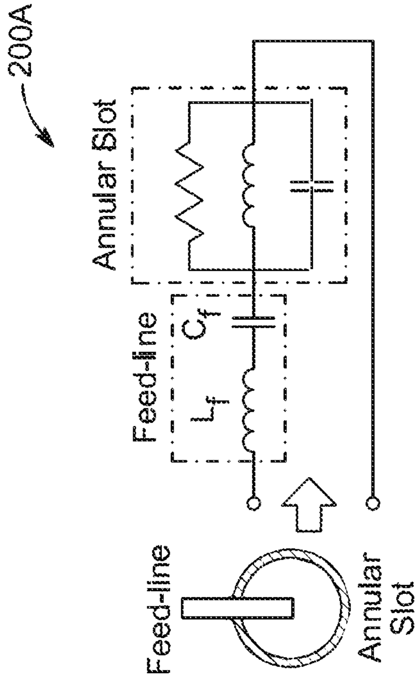
FIG. 2A represents an equivalent circuit model of an annular, slotted antenna apparatus, according to certain embodiments.
Figure 2B:
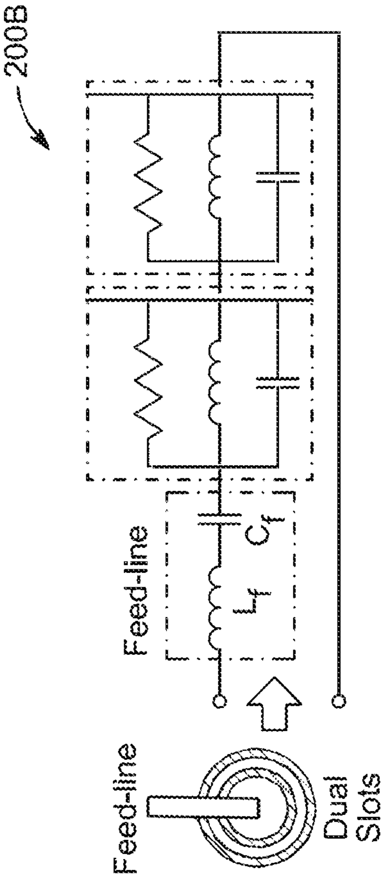
FIG. 2B depicts an equivalent circuit model of another annular, slotted antenna apparatus, according to certain embodiments.
Figure 2C:
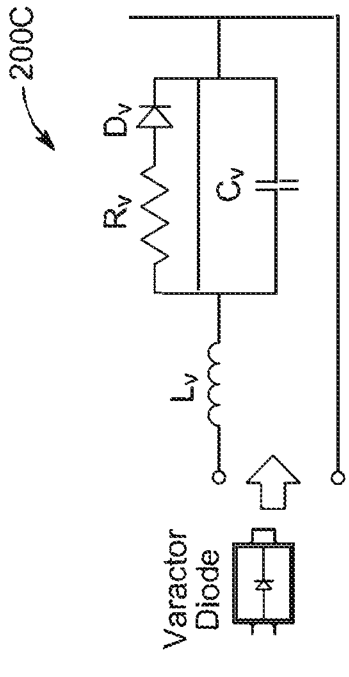
FIG. 2C represents an equivalent circuit model of a varactor diode, according to certain embodiments.

Turning to FIGS. 2A-2C, equivalent circuit models of various portions of the antenna apparatus 100 are shown and described. FIG. 2A shows an equivalent circuit 200A, which includes a series combination of a microstrip feed-line (i.e., a series $L_f$ $C_f$ circuit) and an RLC circuit representing an annular ring structure (i.e., a parallel RLC combination). A similar equivalent circuit 200B is shown in FIG. 2B, illustrating concentric annular ring structures, and thus depicting two parallel RLC circuits in series with the feed-line LC circuit. In FIG. 2C, the varactor diode can be represented in an equivalent circuit 200C as an inductor, denoted as Lv, in series with a parallel combination of a capacitor (Cv) and an ideal diode (Dv)/resistor (Rv) combination.

Figure 2D:
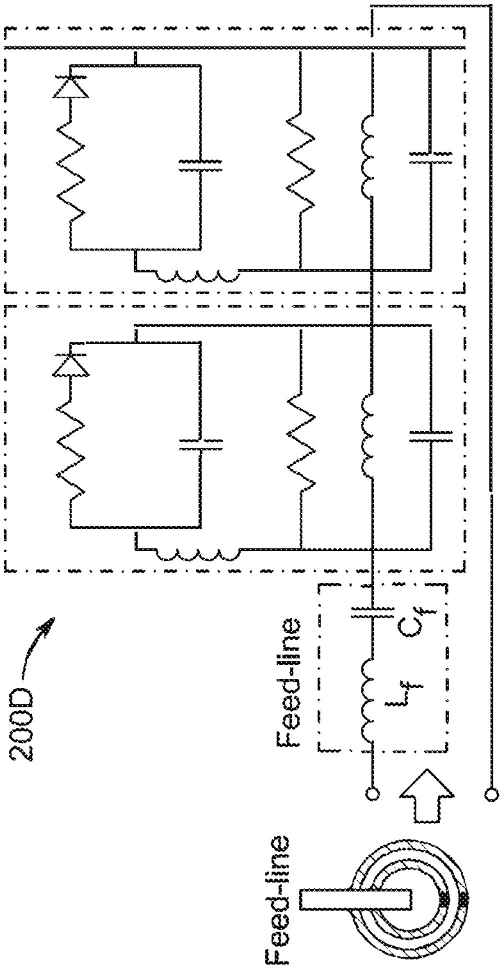
FIG. 2D depicts an equivalent circuit model of an FR, dual-band, MIMO antenna apparatus, according to certain embodiments.

In FIG. 2D, an equivalent circuit model 200D of the antenna apparatus 100 is illustrated, which involves a combination of equivalent circuits 200B and 200C. As shown, the varactor diode equivalent circuit of circuit 200C can be placed in parallel with the RLC circuits of each annular ring shown in circuit 200B. The antenna design of antenna apparatus 100 can be modeled and simulated using modeling software, such as Ansys HFSS™ (available from Ansys, Inc. of Canonsburg, Penn.) using the equivalent circuit model 200D.

Figure 3:
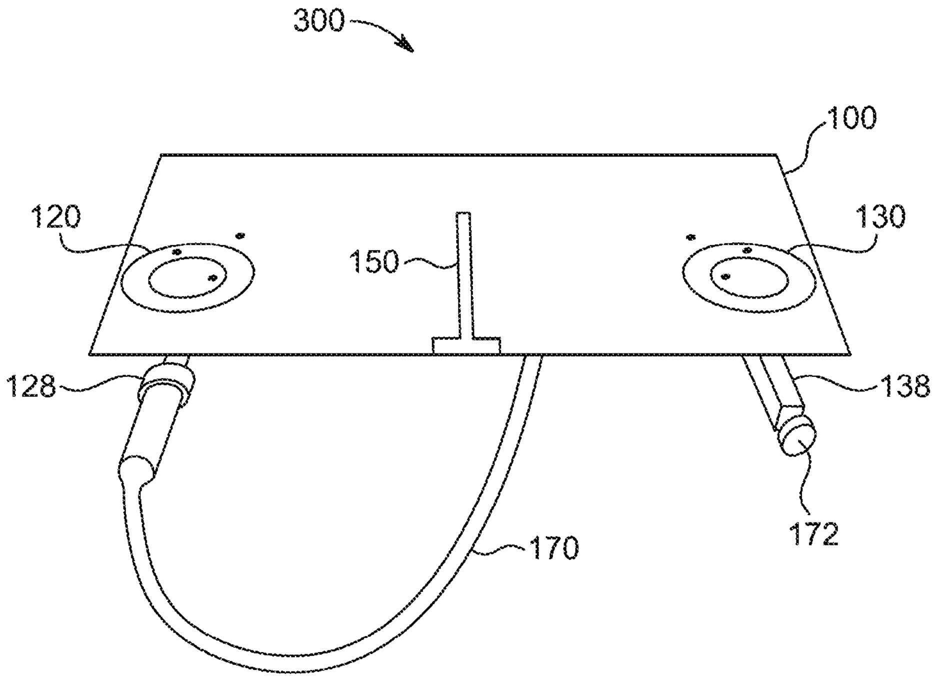
FIG. 3 illustrates a configuration for measurement of radiation characteristics of an FR, dual-band, MIMO antenna apparatus, according to certain embodiments.

FIG. 3 illustrates a configuration 300 for measurement of radiation characteristics of an FR, dual-band, MIMO antenna apparatus, according to certain embodiments. The two-dimensional (2D) gain patterns, as well as scattering parameters and efficiency (% $\eta$) values, can be measured with an anechoic chamber measurement setup as shown in configuration 300.

The antenna apparatus 100, the first element 120, the first connection port 128, the second element 130, the second connection port 138, and the DGS 150 are all substantially similar to those elements as described above. In addition, there is a signal connection 170 connected to the first connection port 128, and a 50-62 load 172 connected to the second connection port 138. Using configuration 300, a number of MIMO parameters can be collected as shown in the below figures and in Table I found below.

Figure 4B:
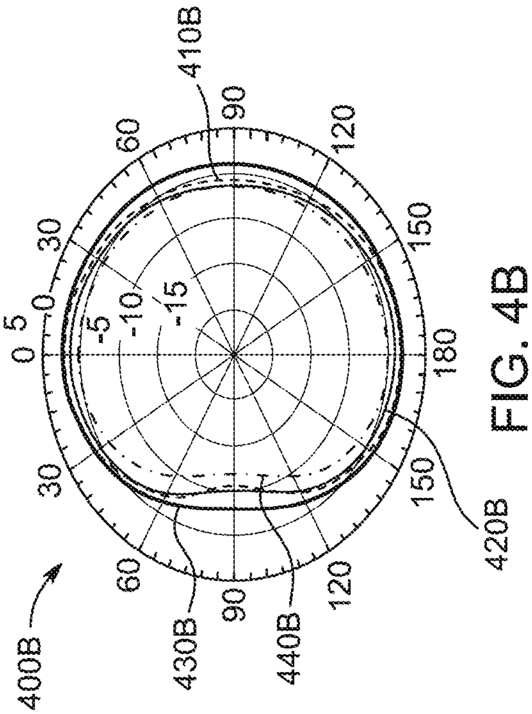
FIG. 4B is a normalized, 2D gain pattern for a second antenna element of an FR, dual-band, MIMO antenna apparatus operating at 2.2 GHz, according to certain embodiments.
Figure 4D:
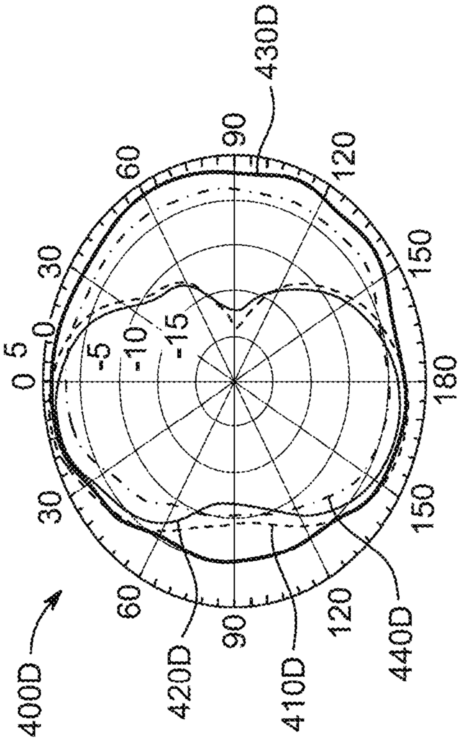
FIG. 4D is a normalized, 2D gain pattern for a second antenna element of an FR, dual-band, MIMO antenna apparatus operating at 3.6 GHz, according to certain embodiments.
Figure 4A:
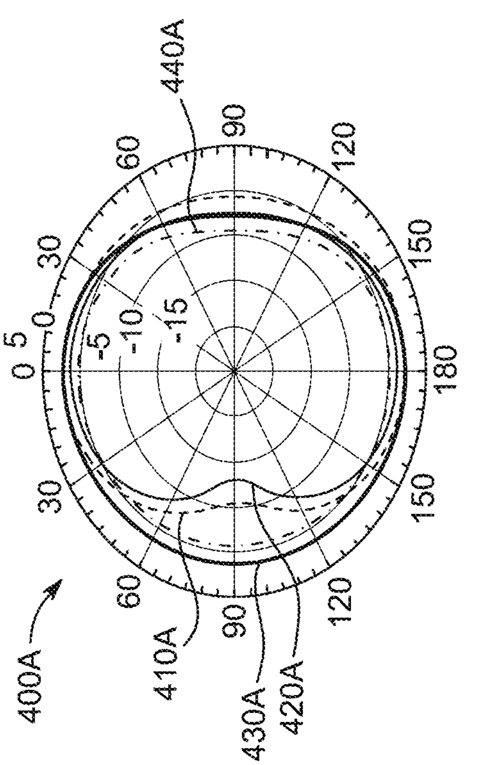
FIG. 4A is a normalized, two-dimensional (2D) gain pattern for a first antenna element of an FR, dual-band, MIMO antenna apparatus operating at 2.2 GHz, according to certain embodiments.

FIG. 4A is a normalized, two-dimensional (2D) gain pattern 400A for the first antenna element 120 of the FR dual-band MIMO antenna apparatus 100 operating at 2.2 GHz. A simulated xz-plane graph 410A is given, which can be compared to a measured xz-plane graph 420A. A simulated yz-plane graph 430A can also be compared to a measured yz-plane graph 440A. In similar fashion, FIG. 4B is a normalized, 2D gain pattern 400B for the second antenna element 130 of the antenna apparatus 100 operating at 2.2 GHz. Corresponding curves 410B-440B represent the counterpart plane graphs in similar fashion (i.e., simulated xz-plane, measured xz-plane, simulated yz-plane, and measured yz-plane, respectively) as those given for pattern 400A.

Figure 4C:
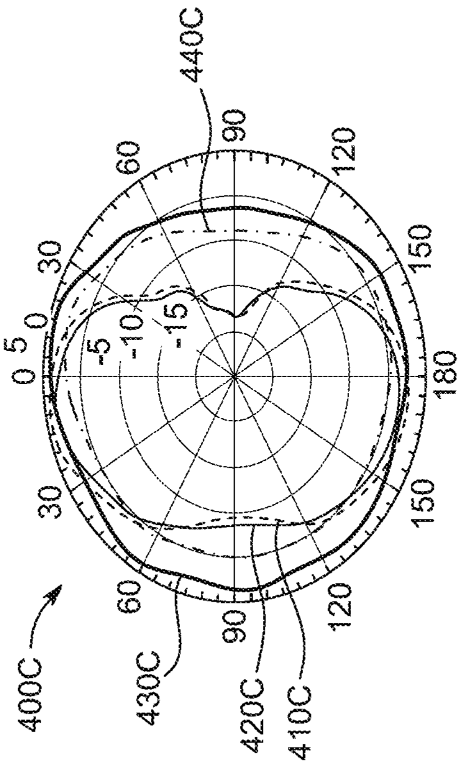
FIG. 4C is a normalized, 2D gain pattern for a first antenna element of an FR, dual-band, MIMO antenna apparatus operating at 3.6 GHz, according to certain embodiments.

FIG. 4C is a normalized, 2D gain pattern 400C for the first antenna element 120 of the FR, dual-band, MIMO antenna apparatus 100 operating at 3.6 GHz. FIG. 4D is a normalized, 2D gain pattern 400D for the second antenna element 130 of the antenna apparatus 100 operating at 3.6 GHz. Each shows the two simulated graphs 410C, 430C, 410D, and 430D and two measured graphs 420C, 440C, 420D, and 440D in the two planes, numbered similarly to those illustrated in FIGS. 4A and 4B. The curves shown in graphs 400A to 400D of FIGS. 4A-4D are θ-cut at $\phi=0°$ and $\phi=90°$. For the measurement of the antenna apparatus 100, a high co-polarization to cross-polarization ratio can be observed by the measurements. Accordingly, good polarization purity occurs across all frequency bands of the antenna apparatus 100.

The peak gain and efficiency (% η) values can be evaluated for the antenna apparatus 100 at different frequency bands. For each measurement, a single antenna element (i.e., antenna element 120 or 130) can be observed, while an opposite port can be terminated with 50-Ω load (i.e., either of first port 128 or second port 138).

The envelop correlation coefficient (ECC), peak gain (PG) and % η values were also computed as shown in Table I. ECC values of less than 0.5 were measured over entire bands of operation of the antenna apparatus 100, indicating suitable MIMO characteristics of the apparatus while in operation.

TABLE I

ECC, Peak gain (PG) and efficiency (% η) values of the proposed antenna

| Simulated Results | | | | Measured Results | | | |
|---|---|---|---|---|---|---|---|
| $f_s$ (GHz) | ECC12 | PG (dBi) | % η | $f_m$ (GHz) | ECC12 | PG (dBi) | % η |
| 1.73 | 0.025 | 1.6 | 71 | 1.74 | 0.031 | 1.45 | 65 |
| 1.79 | 0.035 | 1.95 | 73 | 1.82 | 0.041 | 1.73 | 68 |
| 2.13 | 0.032 | 2.35 | 77 | 2.20 | 0.051 | 2.1 | 71 |
| 2.3 | 0.0523 | 2.85 | 79 | 2.26 | 0.062 | 2.39 | 74 |
| 2.5 | 0.0785 | 3.15 | 83 | 2.52 | 0.082 | 2.988 | 80 |
| 2.72 | 0.135 | 3.42 | 87 | 1.79 | 0.128 | 3.126 | 83 |
| 2.85 | 0.093 | 3.85 | 88 | 2.91 | 0.0831 | 3.62 | 84 |
| 3.025 | 0.091 | 3.86 | 91 | 3.13 | 0.0825 | 3.51 | 87 |
| 3.25 | 0.072 | 4.4 | 92 | 3.30 | 0.052 | 4.13 | 89 |
| 3.6 | 0.0285 | 4.8 | 94 | 3.6 | 0.082 | 4.3 | 90 |

When determining the suitability of the antenna apparatus 100 for 4G and 5G use, the antenna apparatus 100 can be examined in the context of MIMO performance metrics. One important parameter to consider is the ECC (or alternatively denoted as $\rho_e$). ECC is a measure of the field coupling between various correlated channels using radiation patterns. Values of $\rho_e$ less than 0.5 are often sought for suitable MIMO operation. For the design of the antenna apparatus 100, $\rho_e$ is computed for both simulated and measured patterns. Various values with corresponding frequencies are given above in Table I.

Despite the small footprint and close proximity of the antenna elements 120 and 130, the antenna apparatus 100 supports an envelope correlation coefficient of less than 0.5 with radiation patterns exhibited by the antenna elements (as described in further detail below along with other parameters of the antenna apparatus). As seen in Table I above, the antenna apparatus 100 can be configured to support a radiation pattern of antenna elements with a peak gain of 4.3 decibels-isotropic (dBi) at 3.6 GHz. The antenna apparatus 100 can also be configured to support a peak gain of 2.98 dBi at 2.52 GHz. Moreover, the antenna apparatus 100 can be configured to support a radiation pattern with efficiency of 90 percent at 3.6 GHz. In fact, as seen in the table, all of the $\rho_e$ values over the entire frequency band validate the suitability of antenna apparatus 100 for MIMO operation.

Figure 5:
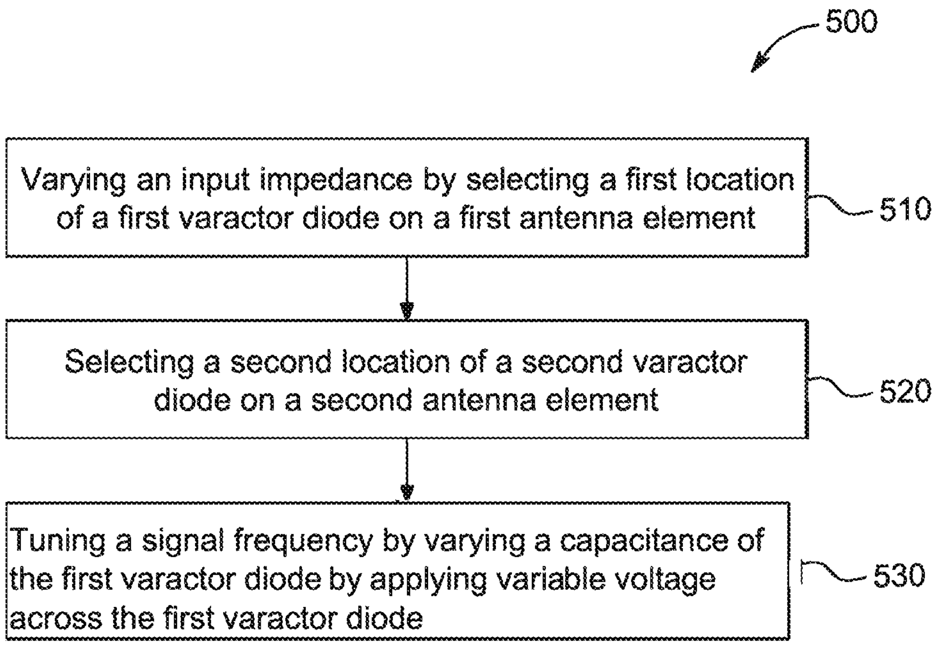
FIG. 5 is a flowchart representing a method of transmitting and receiving a signal at varying frequencies from either of two dual-band, planar, annular, concentric slot MIMO antenna elements, according to certain embodiments.

FIG. 5 is flowchart representing a method 500 of transmitting and receiving a signal at varying frequencies from either of two dual-band planar annular concentric slot MIMO antenna elements. At a step 510, an input impedance is varied by selecting a first location on a first antenna element of a first varactor diode. The first antenna element can be the same as disclosed above with respect to first antenna element 120, and first varactor diode can be either of the varactor diode 140 or 142. At a step 520, a second location on a second antenna element of a second varactor diode is selected. The second antenna element can be the same as disclosed above with respect to second antenna element 130, and second varactor diode can be either of the varactor diode 144 or 146.

In certain embodiments, the varactor location is determined by solving Equation 2 as shown above and below where, $L_1$ is a varactor location, $C_v$ is a varactor capacitance, $Z_0$ is an impedance of a slot antenna element. In the below equation, β is the propagation constant and depends on the frequency of operation. The reverse biased varactor capacitance is represented by C, and ω is the angular frequency of operation.

$$\tan \beta L_1 + \tan \beta(L-L_1) - \omega C Z_0 \tan \beta L_1 \tan \beta(L-L_1) = 0 \quad \text{(Eq. 2)}$$

At a step 530, a signal frequency is tuned by varying a capacitance of the first varactor diode by applying variable voltage across the varactor diode. According to some embodiments, tuning the frequency includes applying a voltage between 0 and 10 V to obtain a frequency range between either 1.7 GHZ and 2.4 GHz or between 2.4 and 3.8 GHz. In instances involving the latter frequency range, the antenna can be configured to have an efficiency of 90 percent at 3.6 GHz. In certain embodiments, the antenna is configured to support a radiation pattern with efficiency of 90 percent.

Figure 6A:
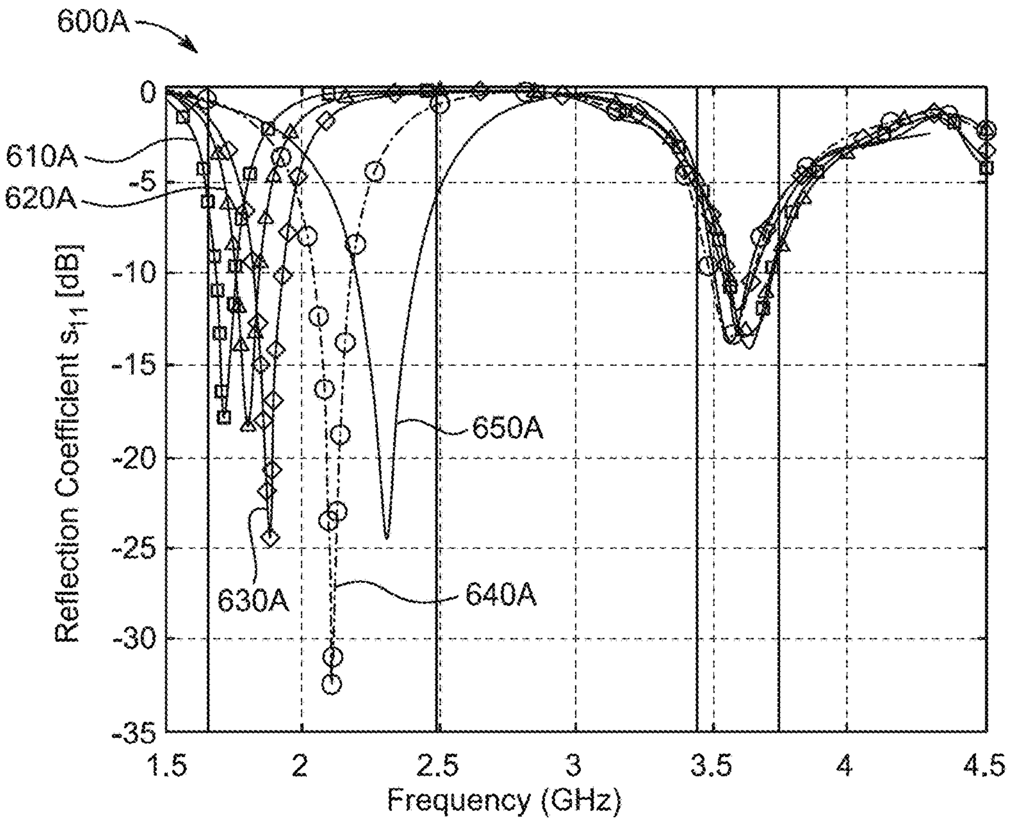
FIGS. 6A-6D are simulated and measured reflection coefficient curves of an FR, dual-band, MIMO antenna apparatus at various capacitance and voltage values, according to certain embodiments.
Figure 6B:
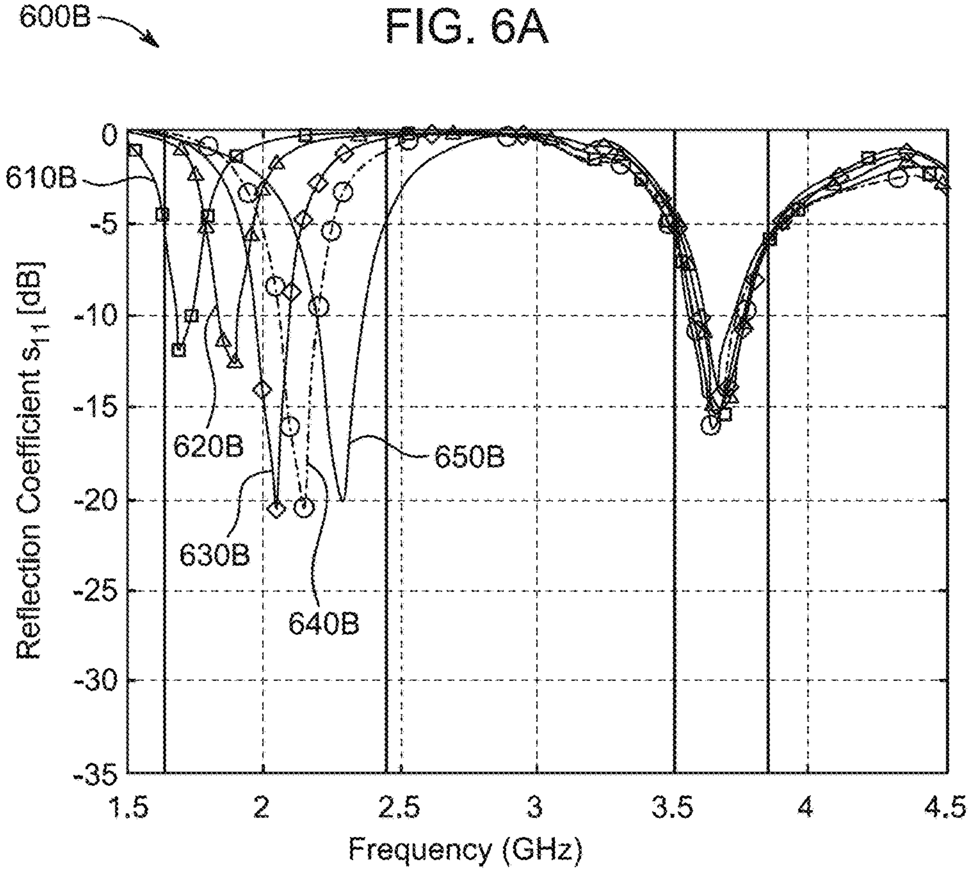
Figure 6C:
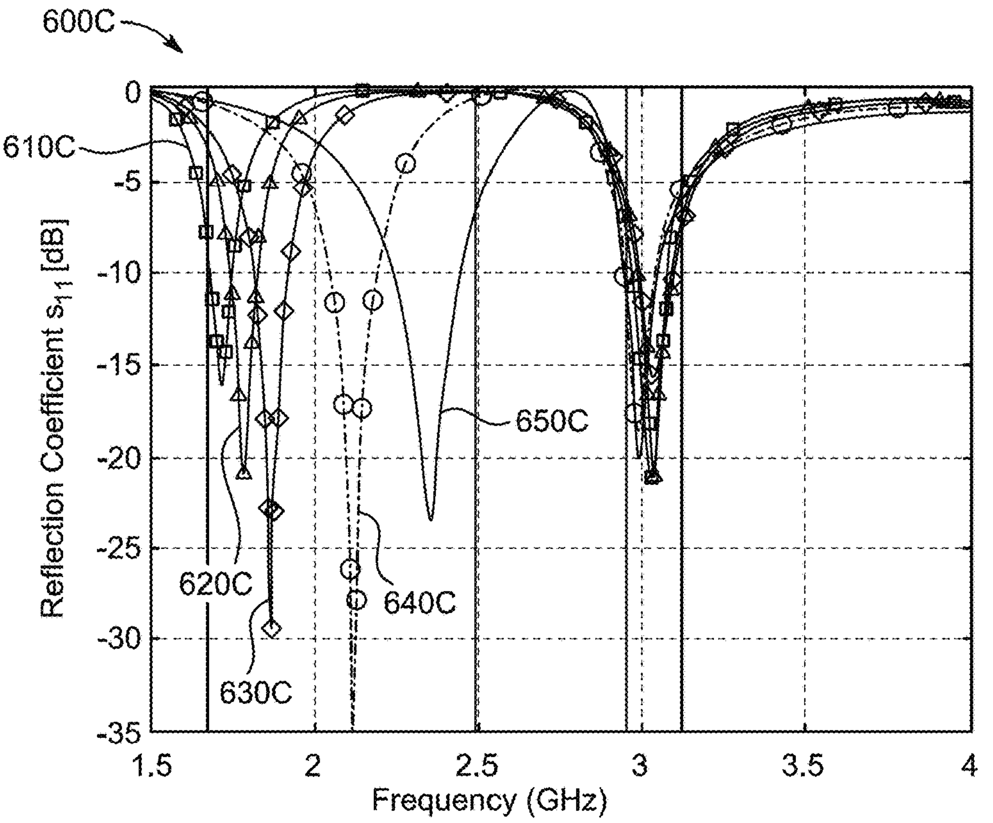
Figure 6D:
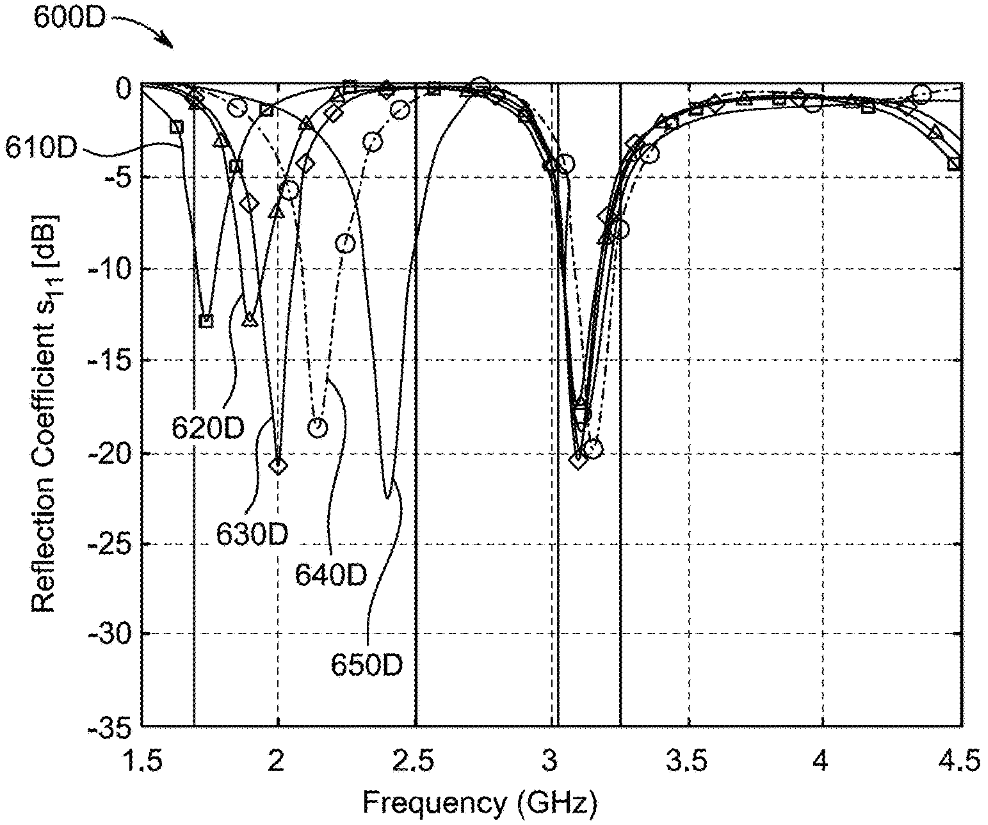

FIGS. 6A-6D are simulated and measured reflection coefficient curves of the antenna apparatus 100 at various capacitance and voltage values. To demonstrate independent tuning for each band, the capacitances ($C_{in}$) of varactor diodes 140 and 144 can be kept constant for inner rings 122 and 132, respectively, while the capacitances ($C_{out}$) for varactor diodes 142 and 146 can be varied from 0.466 pF to 2.35 pF (with corresponding reverse bias voltages from 10 V to 0 V). Graphs 600A and 600B in FIGS. 6A and 6B show the simulated and measured $S_{11}$ curves 610A-650A and 610B-650B, respectively for $C_{in}$ of 0.466 pF (i.e., 10 V) and $C_{out}$ from 0.466 pF to 2.35 pF. The resulting upper band was consistently tuned at 3.6 GHz, while the lower resonating band varied from 1.7-2.5 GHz as seen by curves 610A-650A and 610B to 650B. Graphs 600C and 600D of FIGS. 6C and 6D show similarly tight upper band tuning at approximately 3 GHz and varied lower resonating bands as seen by curves 610C-650C and 610D to 650D, when the bias voltage is lowered to 3 V.

FIGS. 7A-7D are simulated and measured scattering curves (S-curves) of the antenna apparatus 100 at various capacitance and voltage values. The S-curves of graphs 700A-700D again demonstrate the success of antenna apparatus 100 in concurrently and independent tuning across any identified band. The biasing circuits connected to varactor diodes 140-146 have been optimized in such a manner as to enable the same voltage to be applied at both +V terminals of each antenna element for concurrent operation, while different voltages can be applied to obtain the independent tuning of the two bands.

Figure 7A:
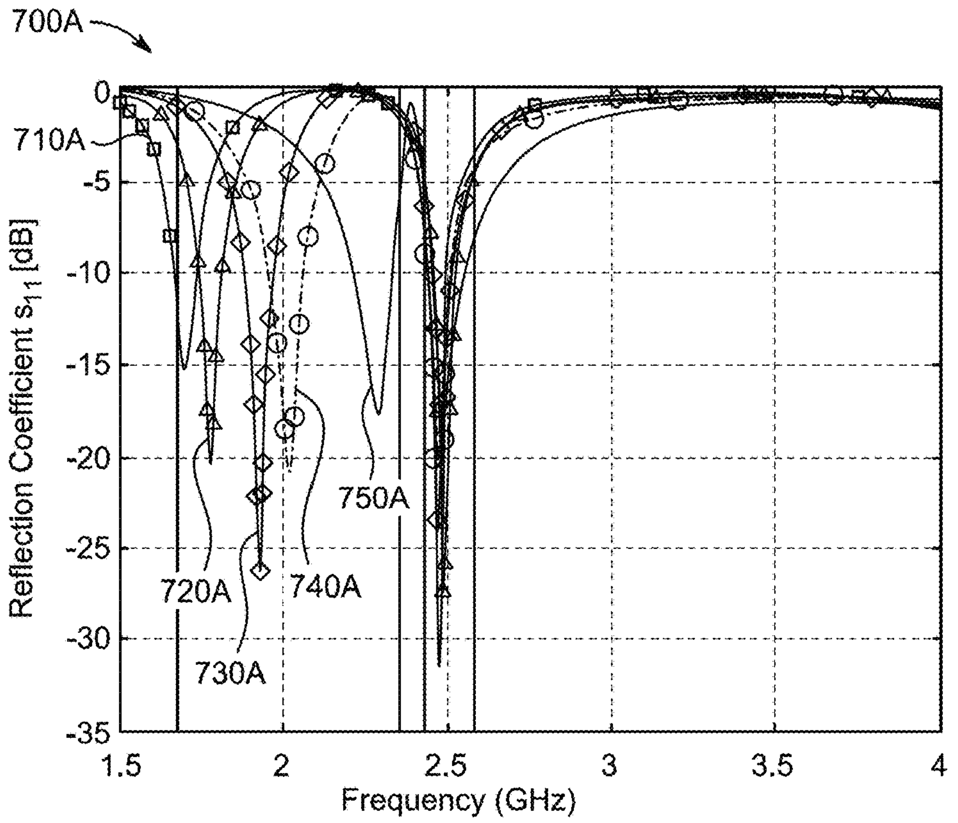
FIGS. 7A-7D are simulated and measured scattering curves (S-curves) of an FR, dual-band, MIMO antenna apparatus at various capacitance and voltage values, according to certain embodiments.
Figure 7B:
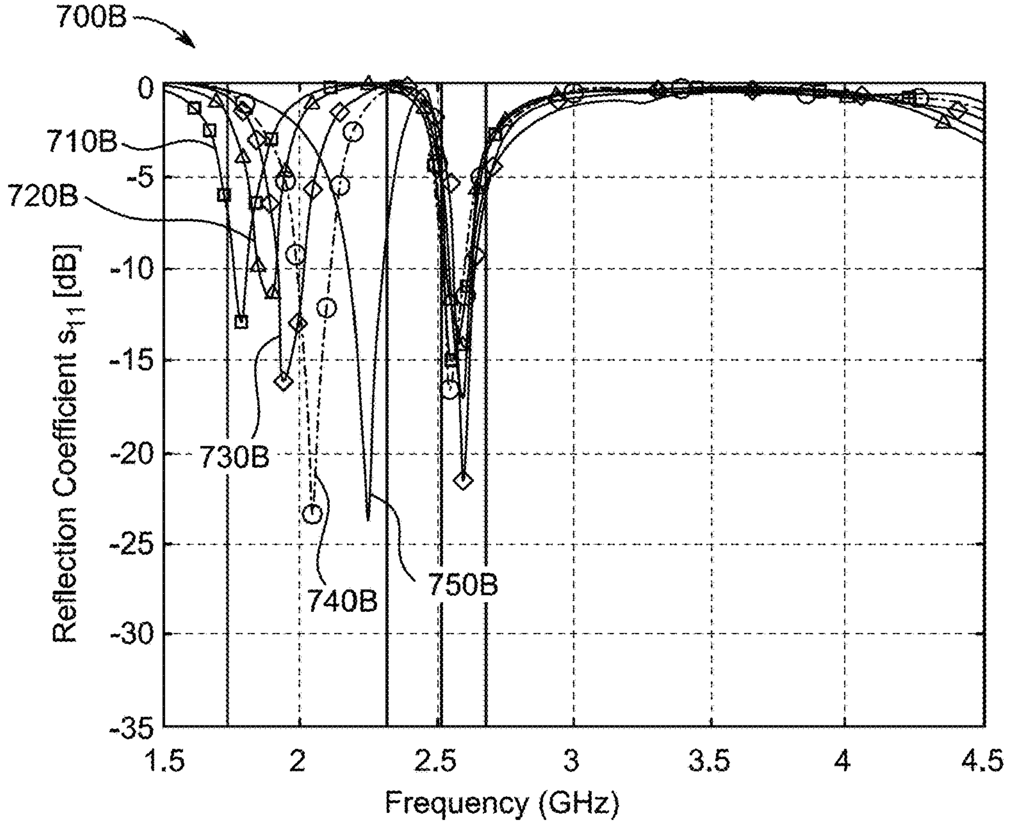
Figure 7C:
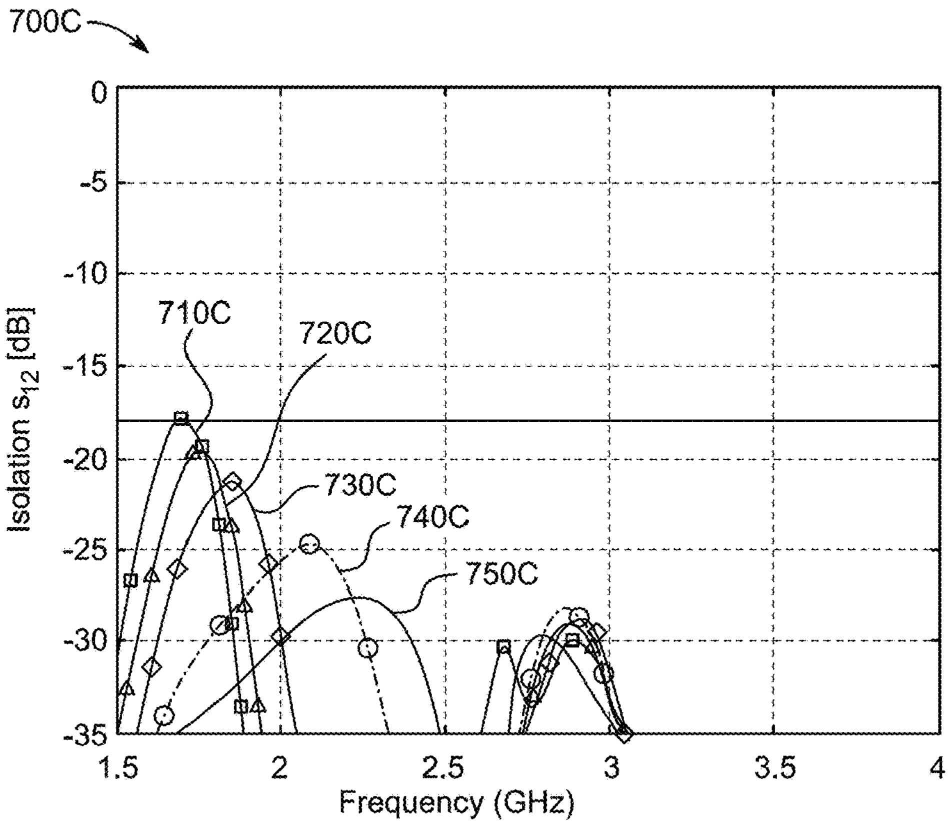
Figure 7D:
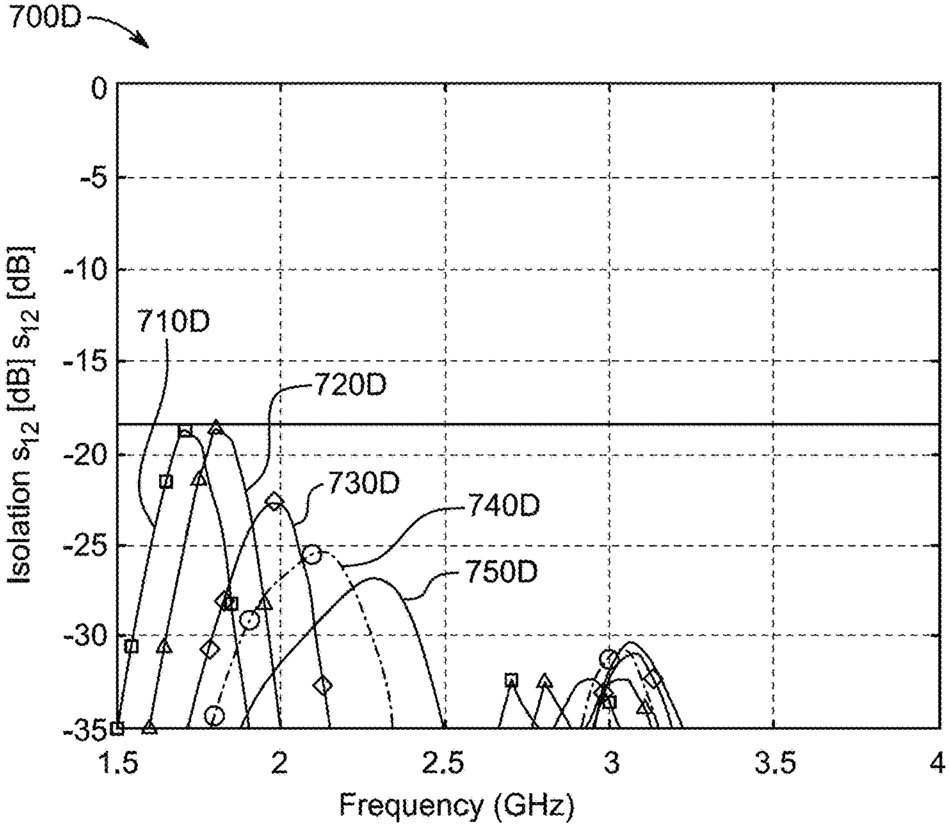

FIGS. 7A and 7B show graphs 700A and 700B with simulated 710A-750A and measured 710B-750B $S_{11}$ curves for ($C_{in}$=0.970 pF and 2.35 pF) with corresponding reverse bias voltage of 3 V and 0 V, respectively. With a controlled reverse bias voltage varying the capacitance of the varactor diodes, a continuous frequency sweep of an upper band was observed from 2.4-3.8 GHz. A minimum-6 dB measured bandwidth of 125 MHz can be observed over substantially entire bands of operation. The potential for mutual coupling between adjacent elements was also evaluated as shown as isolation values of $S_{12}$ (measured in DBs) in FIGS. 7C and 7D. The worst-case isolation value observed over entire bands of operation was −18 dB was for a capacitance value of 0.97 pF as seen by curves 710C-750C and a reverse bias voltage of 3V as seen by curves 710D-750D, respectively, as shown FIGS. 7C and 7D.

A total active reflection coefficient (TARC) is another parameter which can be used to characterize the performance of MIMO components, providing a measure of the effective bandwidth of antenna designs. FIGS. 8A-8D illustrate TARC curves of the antenna apparatus 100 for various capacitance values. Each TARC curve was obtained by exciting the first port of the antenna apparatus 100 (e.g., the first port 128 in FIG. 3) at $1^{j0}$ with zero phase. Various excitation phases were used for the second port (e.g., the second port 138 in FIG. 3) progressing from 0° to 30°, 60°, 90°, 150°, and finally 180°.

Figure 8A:
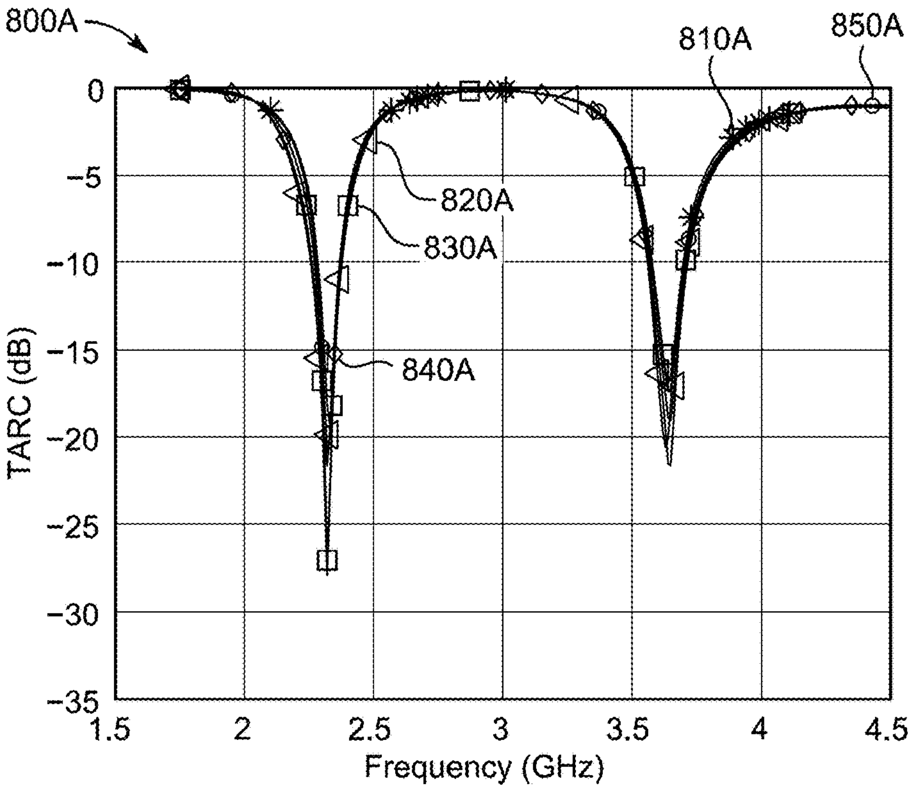
FIGS. 8A-8D illustrate total active reflection coefficient (TARC) curves of an FR, dual-band, MIMO antenna apparatus for various capacitance values, according to certain embodiments.
Figure 8B:
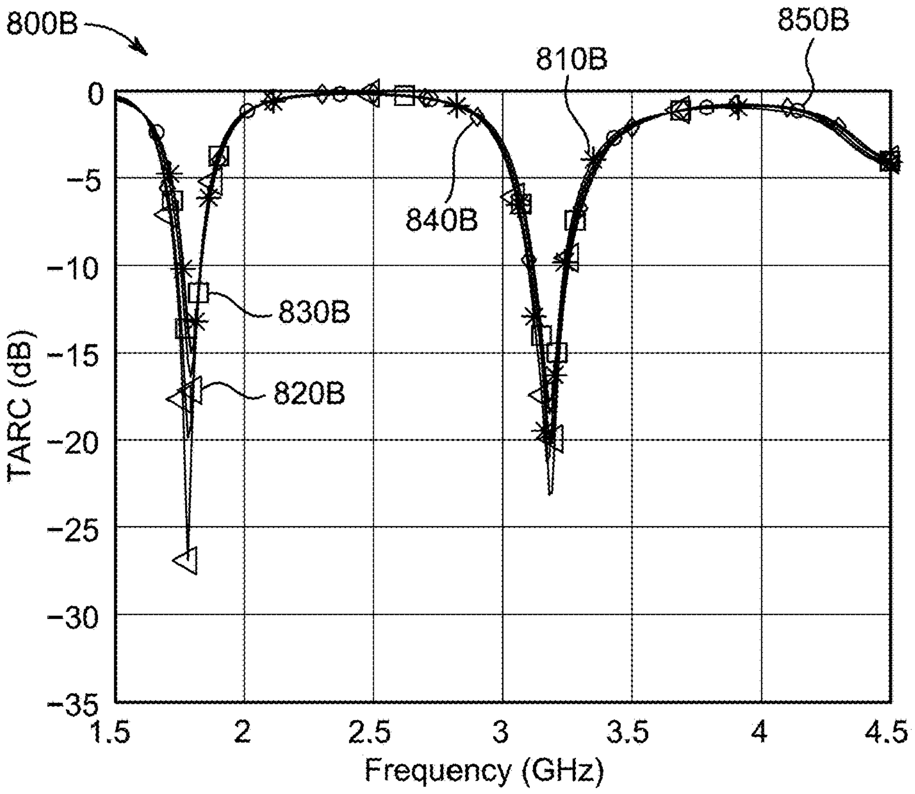
Figure 8C:
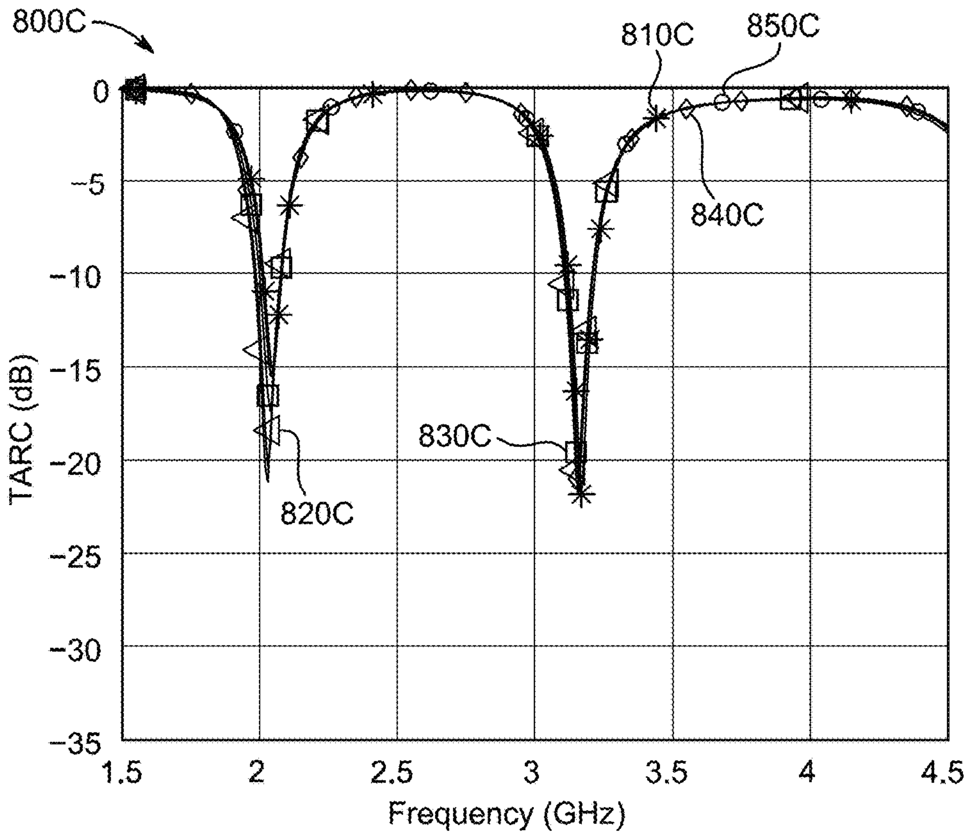
Figure 8D:
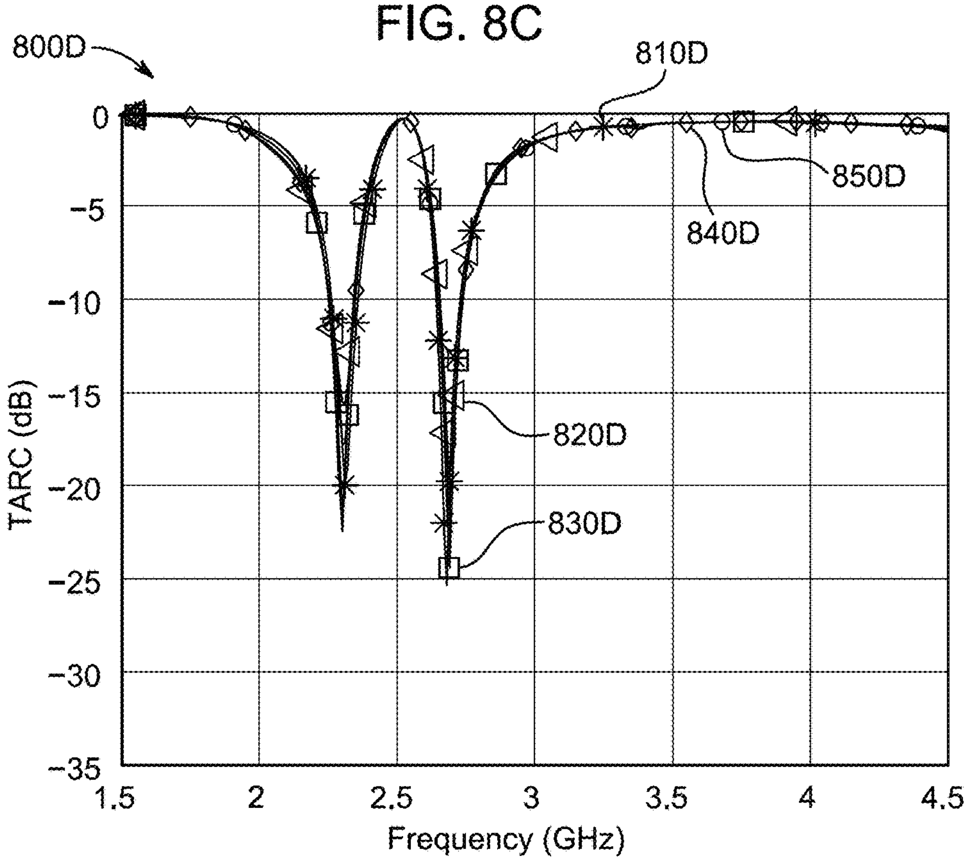

FIG. 8A shows a graph 800A of TARC curves of the antenna apparatus 100 with a capacitance value of 0.84 pF. The ascending excitation phases result in curves 810A, 820A, 830A, 840A, and 850A as seen in FIG. 8A. FIG. 8B represents a graph 800B, of the antenna apparatus 100 at a capacitance value of 0.92 pF, having curves 810B-850B for similarly ascending phase excitations. FIGS. 8C and 8D depict graphs 800C and 800D, respectively, measured for capacitance values of 2.09 pF and 5.08 pF, respectively, for the antenna apparatus 100. Curves 810C-850C shown in FIG. 8C and curves 810D-850D as seen in FIG. 8D follow the same methodology.

From the TARC curves shown in FIGS. 8A-8D, the operating bandwidth of the antenna apparatus 100 is shown to be robust. Moreover, the variation of different excitation phases has minimal effect on the antenna apparatus 100 as seen through these graphs.

Figure 9B:
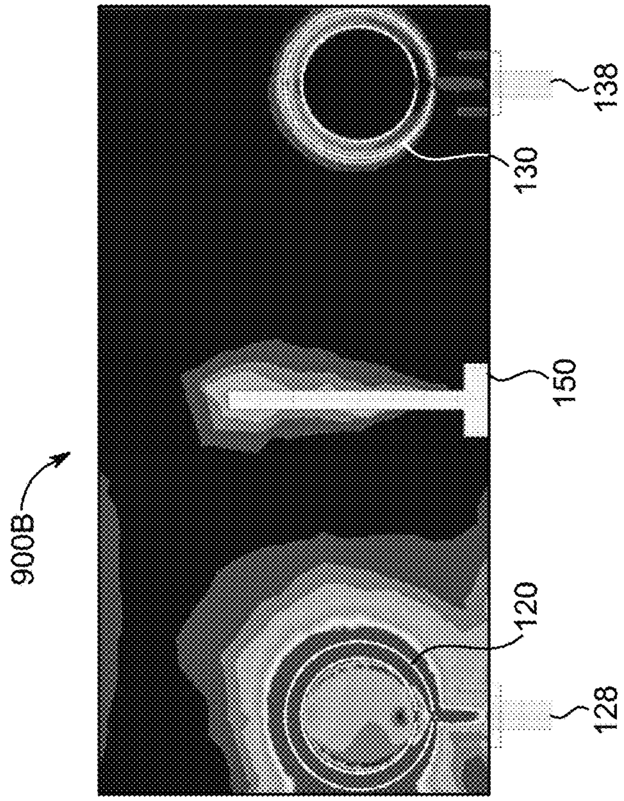
FIG. 9B is a representation of surface current density distribution between elements of an FR, dual-band, MIMO antenna apparatus with a defected ground structure (DGS), according to certain embodiments.
Figure 9A:
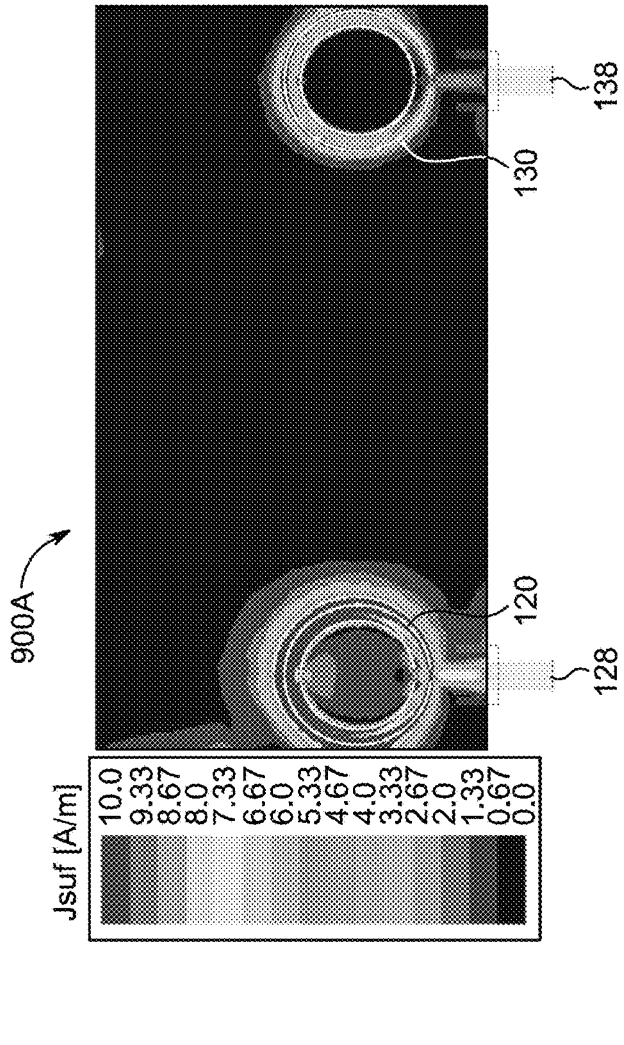
FIG. 9A is a representation of surface current density distribution between elements of an FR, dual-band, MIMO antenna apparatus without a defected ground structure (DGS), according to certain embodiments.

FIG. 9A is a representation 900A of surface current density distribution between elements of the antenna apparatus 100 without a defected ground structure (DGS), such as DGS 150 shown in FIGS. 1B and 1D above. FIG. 9B is a representation 900B of surface current density distribution between elements of the antenna apparatus 100 with a defected ground structure (DGS) 150. Mutual coupling between closely spaced antenna elements was analyzed using the current density distributions of the antenna elements at the lowest operating band of 1.73 GHz. Using this phenomenon, the length of the antenna elements can be mapped to determine the effective electrical length of the resonating bands as well as the mutual coupling between the antenna elements 120 and 130. FIGS. 9A and 9B show the current density for the capacitive loading where $C_{out}$ equals 2.35 pF. This resulted in the antenna apparatus 100 operating at a resonating band of $f_o$ equal to 1.73 GHz.

FIGS. 9A and 9B show the current density distribution without and with the DGS 150. Insignificant mutual coupling can be observed at higher frequency bands, therefore more insightful analysis can be performed at the lowest bands. From graph 900A in FIG. 9A, a considerable coupling can be observed between the two ports 128 and 138. FIG. 9B shows in graph 900B that using a DGS significantly reduces the coupling between the antenna elements 120 and 130. Such analysis enables DGS 150 to be designed effectively and, in turn, the coupling between the closely spaced antenna elements can be reduced.

As shown in the above embodiments and measured characteristics, each band of the antenna apparatus 100 can be independently and concurrent tuned over a wide frequency range from 1.7 GHz to 3.8 GHz. The antenna apparatus 100 has a low profile and compact planar structure with dual bands of operation. The antenna apparatus 100 can be utilized in existing 4G wireless standards, as well as within with sub-6 GHz bands of 5G operation for new RANs using cognitive radio (CR) techniques.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A reconfigurable planar MIMO antenna system comprising:

a two element concentric annular slot frequency reconfigurable dual-band MIMO antenna apparatus, comprising:

a dielectric planar substrate;

a first element comprising a first inner slotted ring having a first radius of 8-9.75 mm connected in series to a first varactor diode and a first outer slotted ring having a second radius of 10.5-12 mm connected in series to a second varactor diode, wherein the first inner slotted ring and the first outer slotted ring are concentric;

a second element comprising a second inner slotted ring having the first radius connected in series to a third varactor diode and a second outer slotted ring having the second radius connected in series to a fourth varactor diode, wherein the second inner slotted ring and the second outer slotted ring are concentric, wherein the second element is separated on the dielectric planar substrate from the first element but coplanar on the dielectric planar substrate with the first element;

a microstrip feed-line feeding the first element and the second element;

wherein the first varactor diode, the second varactor diode, the third varactor diode, and the fourth varactor diode each have a biasing circuitry comprising RF chokes and current limiting resistors; and where the reconfigurable planar MIMO antenna system is frequency reconfigurable between 1.7 GHZ and 3.8 GHz.

2. The antenna system of claim 1 wherein the first varactor diode, the second varactor diode, the third varactor diode, and the fourth varactor diode are configured to change in capacitance from 0.46 pF to 2.4 pF due to a voltage between 10V and 0V applied to the first varactor diode, the second varactor diode, the third varactor diode, and the fourth varactor diode which results in an antenna signal frequency range between 1.7 GHZ and 3.8 GHz.

3. The antenna system of claim 1, further comprising a ground plane formed on a bottom side of the dielectric planar substrate, and wherein the first inner slotted ring, the second inner slotted ring, the first outer slotted ring, and the second outer slotted ring are approximately 0.5 mm in width and are excited by the microstrip feed-line placed on the ground plane.

4. The antenna system of claim 3, wherein the first inner slotted ring, the second inner slotted ring, the first outer slotted ring, and the second outer slotted ring are placed on an outer edge of the ground plane.

5. The antenna system of claim 1, wherein a voltage is applied to a terminal of the first varactor diode, the second varactor diode, the third varactor diode, and the fourth varactor diode to change a capacitance of the first varactor diode, the second varactor diode, the third varactor diode, and the fourth varactor diode thereby tuning an independent external signal frequency of either of the first element or the second element of the antenna apparatus.

6. The antenna system of claim 5, wherein the first element and the second element are configured to transmit or receive a first signal frequency between 1.7 GHZ and 2.4 GHz and a second signal frequency between 2.4 GHz and 3.8 GHz as the capacitance of the first varactor diode, the second varactor diode, the third varactor diode, and the fourth varactor diode changes.

7. The antenna system of claim 1, wherein locations of the first varactor diode, the second varactor diode, the third varactor diode, and the fourth varactor diode are selected to provide an impedance match of the antenna apparatus to an electrical load of the microstrip feed-line.

8. The antenna system of claim 1, wherein the two element concentric annular slot frequency reconfigurable dual-band MIMO antenna apparatus comprises a compact planar structure suitable for use in a mobile device wherein the first element and the second element are less than 12×12 $mm^2$.

9. The antenna system of claim 1, wherein radiation patterns of the first element and the second element are configured to support an envelope correlation coefficient of less than 0.5.

10. The antenna system of claim 1, wherein the antenna system is configured to support a radiation pattern with an efficiency of 90% at 3.6 GHz.

11. The antenna system of claim 1, wherein the antenna system is configured to support a peak gain of 4.3 dBi achieved at 3.6 GHz.

12. The antenna system of claim 1, wherein the antenna system is configured to support a peak gain of 2.98 dBi is achieved at 2.52 GHz.

* * * * *